(12) United States Patent
Fujiki et al.

(10) Patent No.: US 11,467,367 B2
(45) Date of Patent: Oct. 11, 2022

(54) IMAGING DEVICE, IMAGING METHOD, AND PROGRAM

(71) Applicant: FUJIFILM Corporation, Tokyo (JP)

(72) Inventors: Shinichiro Fujiki, Saitama (JP); Akihiro Uchida, Saitama (JP); Koichi Tanaka, Saitama (JP); Kenkichi Hayashi, Saitama (JP); Seiichi Izawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

(21) Appl. No.: 17/022,066

(22) Filed: Sep. 15, 2020

(65) Prior Publication Data

US 2020/0409026 A1 Dec. 31, 2020

Related U.S. Application Data

(63) Continuation of application No. PCT/JP2018/036923, filed on Oct. 2, 2018.

(30) Foreign Application Priority Data

Mar. 23, 2018 (JP) .............................. JP2018-057221

(51) Int. Cl.
*G02B 7/02* (2021.01)
*G02B 7/04* (2021.01)
(Continued)

(52) U.S. Cl.
CPC .................. *G02B 7/04* (2013.01); *G02B 7/28* (2013.01); *G02B 15/14* (2013.01); *G02B 7/282* (2013.01); *G03B 13/36* (2013.01); *H04N 5/232* (2013.01)

(58) Field of Classification Search
CPC ...... G02B 7/04; G02B 7/28–40; G02B 7/102; G02B 7/282; G02B 15/14; G03B 13/36
(Continued)

(56) References Cited

U.S. PATENT DOCUMENTS 8,294,813 B2 10/2012 Kawaguchi et al.
2002/0067421 A1 6/2002 Tanaka et al.
(Continued)

FOREIGN PATENT DOCUMENTS

CN 104301611 1/2015
JP H10191140 7/1998
(Continued)

OTHER PUBLICATIONS

"International Preliminary Report On Patentability (Form PCT/IPEA/409) of PCT/JP2018/036923," completed on May 8, 2019, with English translation thereof, pp. 1-7.
(Continued)

*Primary Examiner* — Mahidere S Sahle
(74) *Attorney, Agent, or Firm* — JCIPRNET

(57) ABSTRACT

An imaging device stores a focal length and a position of a focus lens in a storage unit in a case in which a focal state is determined to be a focus state in which a subject is in focus and at least one of the imaging device or the subject is determined to be stationary; generates tracking data for changing the position of the focus lens according to a change in focal length, using a plurality of stored focal lengths and a plurality of stored positions of the focus lens; and performs a zoom tracking control using the generated tracking data.

12 Claims, 11 Drawing Sheets

(51) Int. Cl.
*G02B 7/28* (2021.01)
*G02B 15/14* (2006.01)
*G03B 13/36* (2021.01)
*H04N 5/232* (2006.01)

(58) Field of Classification Search
USPC .............. 348/345; 359/694–706, 822–828; 396/80
See application file for complete search history.

(56) References Cited

U.S. PATENT DOCUMENTS

2010/0178045 A1 7/2010 Hongu
2017/0272661 A1* 9/2017 Tsubusaki ........ H04N 5/232123

FOREIGN PATENT DOCUMENTS

| | | | |
|---|---|---|---|
| JP | H10191162 | | 7/1998 |
| JP | 2005025118 | | 1/2005 |
| JP | 2009081810 | | 4/2009 |
| JP | 2010164680 | | 7/2010 |
| JP | 2014164028 | | 9/2014 |
| JP | 2014174362 | | 9/2014 |
| JP | 2015148741 A | * | 8/2015 |
| WO | 2009013850 | | 1/2009 |

OTHER PUBLICATIONS

"International Search Report (Form PCT/ISA/210) of PCT/JP2018/036923," dated Dec. 18, 2018, with English translation thereof, pp. 1-5.

"Written Opinion of the International Searching Authority (Form PCT/ISA/237) of PCT/JP2018/036923," dated Dec. 18, 2018, with English translation thereof, pp. 1-8.

* cited by examiner

IMAGING DEVICE, IMAGING METHOD, AND PROGRAM

CROSS-REFERENCE TO RELATED APPLICATION

This application is a continuation application of International Application No. PCT/JP2018/036923, filed on Oct. 2, 2018, the disclosure of which is incorporated herein by reference in its entirety. Further, this application claims priority from Japanese Patent Application No. 2018-057221 filed on Mar. 23, 2018, the disclosure of which is incorporated herein by reference in its entirety.

BACKGROUND

1. Technical Field

The present disclosure relates to an imaging device, an imaging method, and a program.

2. Description of the Related Art

In the related art, a lens device which calculates tracking data as a relationship between a position of a focus lens and a position of a zoom lens at a predetermined object distance in a case where an image forming position of an optical system is within a focal depth is disclosed (refer to JP2014-174362A).

A lens control device which moves a focus lens so as to maintain a focus state during the movement of a zoom lens on the basis of contrast information in an autofocus evaluation area and lens and iris information of an optical system is disclosed (JP2005-025118A).

Further, an imaging device comprising an operation unit that receives an instruction for an imaging preparation operation or imaging operation by a user, and a discrimination unit that discriminates an imaging scene on the basis of an image obtained through imaging is disclosed (WO2009/013850A). This imaging device changes a method of discriminating the imaging scene by the discrimination unit before and after the operation unit is operated by the user.

SUMMARY

Meanwhile, in a case of generating tracking data for changing a position of a focus lens according to a change in focal length, the tracking data may not be accurately generated unless at least one of the imaging device itself or the subject is stationary.

However, in the techniques disclosed in JP2014-174362A, JP2005-025118A, and WO2009/013850A, consideration is not given to whether at least one of the imaging device itself or the subject is stationary.

The present disclosure has been made in view of the above circumstances, and provides an imaging device, an imaging method, and a program which can accurately generate tracking data.

An imaging device according to an aspect of the present disclosure comprises an imaging lens having an imaging optical system including a zoom lens and a focus lens; an imaging unit that captures an optical image having passed through the imaging lens; a stationariness determination unit that determines whether at least one of the imaging device or a subject is stationary; a focus determination unit that determines whether a focal state is a focus state in which the subject is in focus; a storage control unit that stores a focal length and a position of the focus lens in a storage unit in a case where the focal state is determined to be the focus state by the focus determination unit and at least one of the imaging device or the subject is determined to be stationary by the stationariness determination unit; a generation unit that generates tracking data for changing the position of the focus lens according to a change in focal length, using a plurality of focal lengths and a plurality of positions of the focus lens stored in the storage unit; and a zoom tracking control unit that performs a zoom tracking control using the tracking data generated by the generation unit.

In the imaging device according to the aspect of the present disclosure, the generation unit may generate the tracking data in a case where at least one of the imaging device or the subject is determined not to be stationary by the stationariness determination unit.

The imaging device according to the aspect of the present disclosure may further comprise a change unit that changes a size of a focus area according to the focal length.

In the imaging device according to the aspect of the present disclosure, the change unit may enlarge the focus area in a case where an initial focal length in a case where the focal state is first determined to be the focus state by the focus determination unit is closer to a wide angle side than a current focal length in a case where the focal state is determined to be the focus state from a next time by the focus determination unit, and reduce the focus area in a case where the initial focal length is closer to a telephoto side than the current focal length.

In the imaging device according to the aspect of the present disclosure, the generation unit may discard the generated tracking data in a case where an error between data obtained by approximating reference tracking data corresponding to the imaging lens to the generated tracking data and the generated tracking data is out of a predetermined range.

In the imaging device according to the aspect of the present disclosure, the generation unit may generate the tracking data by deriving the position of the focus lens corresponding to a reference focal length by interpolating the position of the focus lens corresponding to the reference focal length using a plurality of focal lengths within a predetermined range of the reference focal length and a plurality of positions of the focus lens corresponding to the plurality of focal lengths, in a case where the reference focal length is not stored in the storage unit.

In the imaging device according to the aspect of the present disclosure, the generation unit may generate the tracking data in a case where a predetermined number or more of focal lengths and positions of the focus lens are stored in the storage unit.

In the imaging device according to the aspect of the present disclosure, the stationariness determination unit may determine whether the subject is stationary using an initial image obtained by imaging the subject by the imaging unit in a case where that the focal state is first determined to be the focus state by the focus determination unit, and a current image obtained by imaging the subject by the imaging unit in a case where the focal state is determined to be the focus state from a next time by the focus determination unit.

In the imaging device according to the aspect of the present disclosure, the stationariness determination unit may determine whether the subject is stationary using an image obtained by performing trimming and resizing on the initial image or the current image according to the focal length.

In the imaging device according to the aspect of the present disclosure, the stationariness determination unit may perform trimming and resizing on the initial image in a case where the focal length in a case of capturing the current image is closer to a telephoto side than the focal length in a case of capturing the initial image, and perform trimming and resizing on the current image in a case where the focal length in a case of capturing the current image is closer to a wide angle side than the focal length in a case of capturing the initial image.

The imaging device according to the aspect of the present disclosure may further comprise a sensor that detects vibration of the imaging device, in which the stationariness determination unit may determine whether the imaging device is stationary using an output from the sensor in a case where the focal state is first determined to be the focus state by the focus determination unit and an output from the sensor in a case where the focal state is determined to be the focus state from a next time by the focus determination unit.

Meanwhile, an imaging method according to another aspect of the present disclosure is an imaging method executed by an imaging device including an imaging lens having an imaging optical system including a zoom lens and a focus lens, and an imaging unit that captures an optical image having passed through the imaging lens, and the imaging method comprises determining whether at least one of the imaging device or a subject is stationary; determining whether a focal state is a focus state in which the subject is in focus; storing a focal length and a position of the focus lens in a storage unit in a case where the focal state is determined to be the focus state and at least one of the imaging device or the subject is determined to be stationary; generating tracking data for changing the position of the focus lens according to a change in focal length, using a plurality of focal lengths and a plurality of positions of the focus lens stored in the storage unit; and performing a zoom tracking control using the generated tracking data.

A program according to another aspect of the present disclosure causes a computer, which controls an imaging device including an imaging lens having an imaging optical system including a zoom lens and a focus lens, and an imaging unit that captures an optical image having passed through the imaging lens, to execute processing comprising: determining whether at least one of the imaging device or a subject is stationary; determining whether a focal state is a focus state in which the subject is in focus; storing a focal length and a position of the focus lens in a storage unit in a case where the focal state is determined to be the focus state and at least one of the imaging device or the subject is determined to be stationary; generating tracking data for changing the position of the focus lens according to a change in focal length, using a plurality of focal lengths and a plurality of positions of the focus lens stored in the storage unit; and performing a zoom tracking control using the generated tracking data.

An imaging device according to another aspect of the present disclosure comprises an imaging lens having an imaging optical system including a zoom lens and a focus lens, an imaging unit that captures an optical image having passed through the imaging lens, a memory that stores an instruction for a computer to execute, and a processor configured to execute the stored instruction, in which the processor determines whether at least one of the imaging device or a subject is stationary; determines whether a focal state is a focus state in which the subject is in focus; stores a focal length and a position of the focus lens in a storage unit in a case where the focal state is determined to be the focus state and determining that at least one of the imaging device or the subject is determined to be stationary; generates tracking data for changing the position of the focus lens according to a change in focal length, using a plurality of focal lengths and a plurality of positions of the focus lens stored in the storage unit; and performs a zoom tracking control using the generated tracking data.

According to the present disclosure, it is possible to accurately generate tracking data.

BRIEF DESCRIPTION OF THE DRAWINGS

Exemplary embodiments according to the technique of the present disclosure will be described in detail based on the following figures, wherein.

DETAILED DESCRIPTION

Hereinafter, embodiments for implementing the technique of the present disclosure will be described in detail with reference to the drawings.

First Embodiment

First, a configuration of an imaging device 10 according to the embodiment will be described with reference to FIGS.

Figure 1:
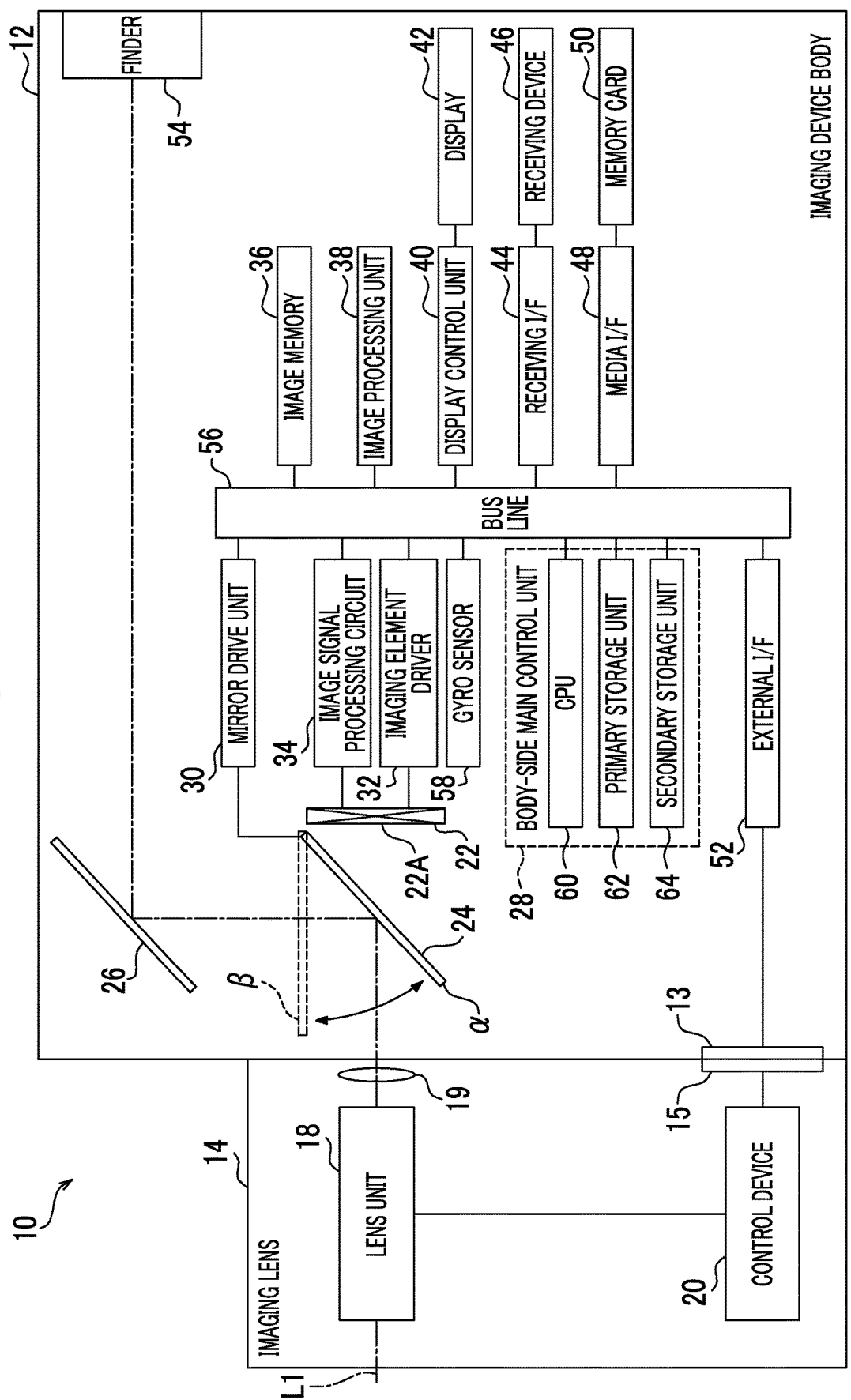
FIG. 1 is a block diagram illustrating an example of a hardware configuration of an imaging device according to each embodiment.

1 and 2. As illustrated in FIG. 1, the imaging device 10 is a lens-interchangeable digital camera, and includes an imaging device body 12 and an imaging lens 14. The imaging lens 14 is mounted on the imaging device body 12 to be interchangeable.

The imaging device 10 according to the embodiment has a static image capturing mode and a video capturing mode as operation modes of an imaging system. The static image capturing mode is an operation mode of recording a static image obtained by imaging a subject, and the video capturing mode is an operation mode of recording a video obtained by imaging a subject.

The static image capturing mode and the video capturing mode are selectively set in the imaging device 10 according to an instruction that is given to the imaging device 10 from a user. Further, in the static image capturing mode, a manual focus mode and an autofocus mode are selectively set according to an instruction that is given to the imaging device 10 from a user. In the following, the autofocus is described as "autofocus (AF)".

In the AF mode, a release button (not illustrated) provided on the imaging device body 12 is made to be in a half-pressed state to adjust imaging conditions and is then made to be in a fully-pressed state to perform main exposure. That is, after an auto exposure (AE) function works to set an exposure state by making the release button to be in the half-pressed state, an AF function works to perform focusing control, and imaging is performed in a case where the release button is made to be in the fully-pressed state.

The imaging device body 12 comprises a mount 13, and the imaging lens 14 comprises a mount 15. The mount 15 is joined to the mount 13 so that the imaging lens 14 is mounted on the imaging device body 12 to be interchangeable. The imaging lens 14 includes a lens unit 18, a stop 19, and a control device 20. The stop 19 is provided closer to the imaging device body 12 than the lens unit 18, and the stop 19 adjusts an amount of subject light transmitted through the lens unit 18 and guides the subject light into the imaging device body 12. The control device 20 is electrically connected to the imaging device body 12 through the mounts 13 and 15, and controls the entire imaging lens 14 according to an instruction from the imaging device body 12.

The imaging device body 12 includes an imaging element 22, a first mirror 24, a second mirror 26, a body-side main control unit 28, a mirror drive unit 30, an imaging element driver 32, an image signal processing circuit 34, an image memory 36, an image processing unit 38, a display control unit 40, and a display 42. In addition, the imaging device body 12 further includes a receiving interface (I/F) 44, a receiving device 46, a media I/F 48, a memory card 50, an external I/F 52, a finder 54, and a gyro sensor 58. The imaging element 22 is an example of an imaging unit that captures an optical image having passed through the imaging lens 14.

The body-side main control unit 28 is an example of a computer that controls the imaging device 10, and comprises a central processing unit (CPU) 60, a primary storage unit 62, and a secondary storage unit 64. The CPU 60 controls the entire imaging device 10. The primary storage unit 62 is a volatile memory that is used as a work area and the like in a case of execution of various programs. Examples of the primary storage unit 62 include a random access memory (RAM). The secondary storage unit 64 is a non-volatile memory that stores various programs, various parameters, and the like in advance. Examples of the secondary storage unit 64 include a flash memory.

The CPU 60, the primary storage unit 62, and the secondary storage unit 64 are connected to a bus line 56. In addition, the mirror drive unit 30, the imaging element driver 32, the image signal processing circuit 34, the image memory 36, the image processing unit 38, the display control unit 40, the receiving I/F 44, the media I/F 48, the external I/F 52, and the gyro sensor 58 are also connected to the bus line 56.

The first mirror 24 is a movable mirror that is interposed between a light-receiving surface 22A of the imaging element 22 and the lens unit 18 and is movable between a light-receiving surface covering position α and a light-receiving surface opening position β. The first mirror 24 is connected to the mirror drive unit 30, and the mirror drive unit 30 drives the first mirror 24 under the control of the CPU 60 to selectively dispose the first mirror 24 at the light-receiving surface covering position α and the light-receiving surface opening position β. That is, the first mirror 24 is disposed at the light-receiving surface covering position α by the mirror drive unit 30 in a case where subject light is not to be received by the light-receiving surface 22A, and the first mirror 24 is disposed at the light-receiving surface opening position β by the mirror drive unit 30 in a case where subject light is to be received by the light-receiving surface 22A.

At the light-receiving surface covering position α, the first mirror 24 covers the light-receiving surface 22A and reflects the subject light, which is guided from the lens unit 18, to guide the subject light to the second mirror 26. The second mirror 26 reflects the subject light, which is guided from the first mirror 24, to guide the subject light to the finder 54 through the optical system (not illustrated). The finder 54 transmits the subject light that is guided by the second mirror 26. At the light-receiving surface opening position β, a state where the light-receiving surface 22A is covered with the first mirror 24 is released, and subject light is received by the light-receiving surface 22A without being reflected by the first mirror 24.

The imaging element driver 32 is connected to the imaging element 22, and supplies driving pulses to the imaging element 22 under the control of the CPU 60. Respective pixels of the imaging element 22 are driven according to the driving pulses that are supplied by the imaging element driver 32. In the embodiment, a charge coupled device (CCD) image sensor is used as the imaging element 22, but the technique of the present disclosure is not limited thereto and other image sensors such as a complementary metal oxide semiconductor (CMOS) image sensor may be used.

The image signal processing circuit 34 reads, for each pixel, image signals corresponding to one frame from the imaging element 22 under the control of the CPU 60. The image signal processing circuit 34 performs various kinds of processing, such as correlative double sampling processing, automatic gain control, and A/D conversion, on the read image signals. The image signal processing circuit 34 outputs digitized image signals, which are obtained by performing various kinds of processing on the image signals, to the image memory 36 for each frame at a predetermined frame rate (for example, several tens of frames/second) that is defined by a clock signal supplied from the CPU 60. The image memory 36 temporarily holds the image signals that are input from the image signal processing circuit 34.

The image processing unit 38 acquires image signals from the image memory 36 for each frame at a predetermined frame rate, and performs various kinds of processing, such as gamma correction, luminance/color difference conversion, and compression processing, on the acquired image signals. In addition, the image processing unit 38 outputs the image signals, which are obtained through the various kinds of processing, to the display control unit 40 for each frame at a predetermined frame rate. Further, the image processing unit 38 outputs the image signals, which are obtained through the various kinds of processing, to the CPU 60 in response to the request of the CPU 60.

The display control unit 40 is connected to the display 42, and controls the display 42 under the control of the CPU 60. Further, the display control unit 40 outputs the image signals, which are input from the image processing unit 38, to the display 42 for each frame at a predetermined frame rate. The display 42 displays an image represented by the image signals which are input at a predetermined frame rate from the display control unit 40, as a live view image. Further, the display 42 also displays a static image that is a single frame image obtained through imaging with a single frame. A menu screen and the like are also displayed on the display 42 in addition to the live view image.

The receiving device 46 has a dial, the release button, a cross key, a MENU key, a touch panel, and the like which are not illustrated, and receives various instructions from a user. The receiving device 46 is connected to the receiving I/F 44, and outputs an instruction content signal indicating the contents of the received instruction, to the receiving I/F 44. The receiving I/F 44 outputs the instruction content signal, which is input from the receiving device 46, to the CPU 60. The CPU 60 executes processing corresponding to the instruction content signal input from the receiving I/F 44.

The media I/F 48 is connected to the memory card 50, and performs recording and reading of an image file with respect to the memory card 50 under the control of the CPU 60. Under the control of the CPU 60, the image file that is read from the memory card 50 by the media I/F 48 is subjected to decompression processing by the image processing unit 38 to be displayed on the display 42 as a playback image.

The mount 15 is connected to the mount 13 so that the external I/F 52 is connected to the control device 20 of the imaging lens 14, and the external I/F 52 takes charge of transmission and reception of various kinds of information between the CPU 60 and the control device 20.

The gyro sensor 58 is an example of a sensor for detecting vibration of the imaging device 10, and outputs a signal according to the vibration of the imaging device 10. The CPU 60 derives a shake angle of the imaging device 10 by integrating the output signal from the gyro sensor 58.

Figure 2:
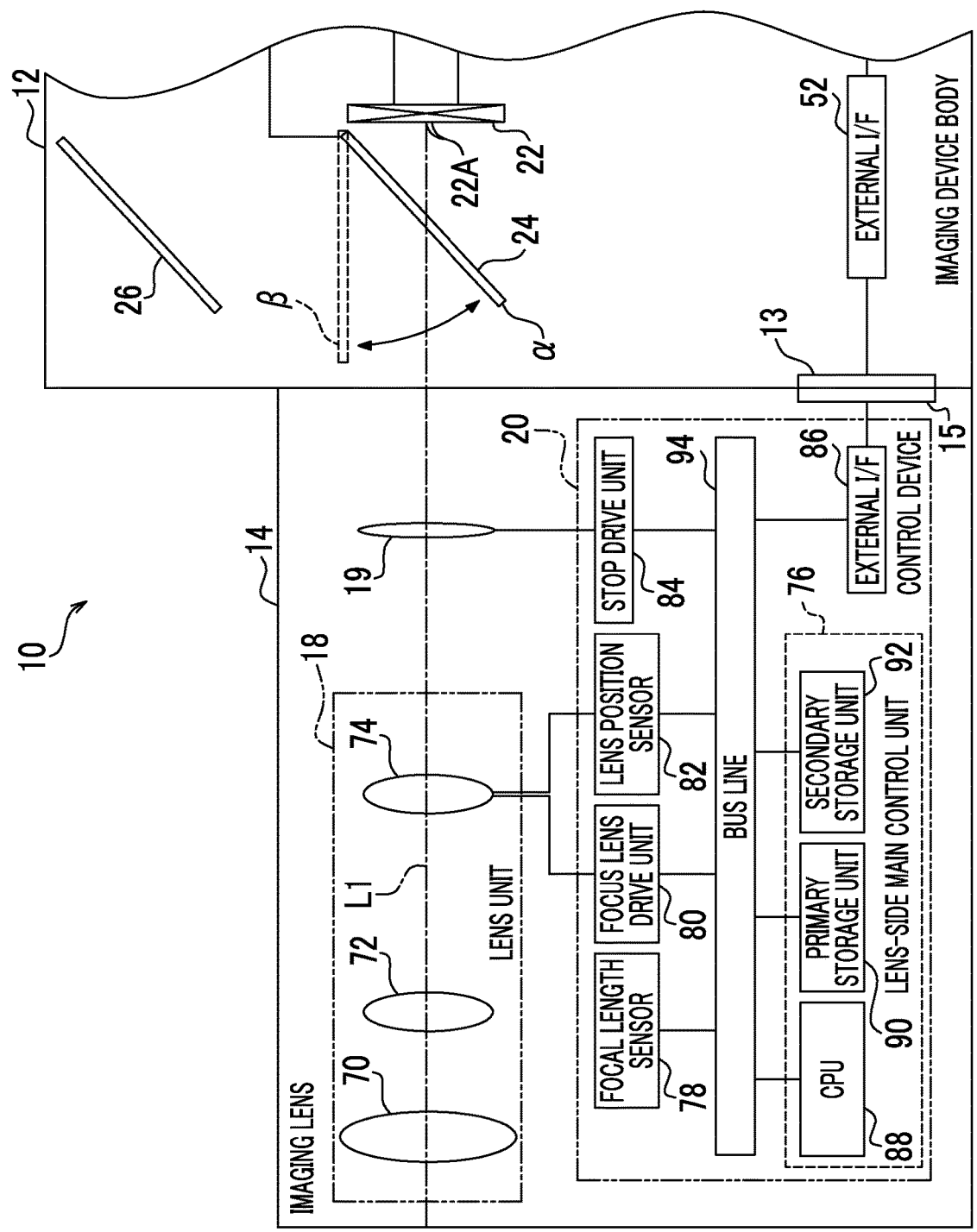
FIG. 2 is a block diagram illustrating an example of a hardware configuration of an imaging lens included in the imaging device according to each embodiment.

As illustrated in FIG. 2, for example, the lens unit 18 according to the embodiment includes an incident lens 70, a zoom lens 72, and a focus lens 74. The incident lens 70, the zoom lens 72, and the focus lens 74 are arranged along an optical axis L1; and the focus lens 74, the zoom lens 72, and the incident lens 70 are arranged along the optical axis L1 in this order from the stop 19 side.

Subject light is incident on the incident lens 70. The incident lens 70 transmits the subject light and guides the subject light to the zoom lens 72. The zoom lens 72 according to the embodiment includes a plurality of lenses that are movable along the optical axis L1, and the focal length of the imaging lens 14 (hereinafter, simply referred to as a "focal length") is adjusted by adjusting the state of the zoom lens 72. Specifically, in the zoom lens 72, a zoom ring (not illustrated) provided in the imaging lens 14 is rotated to cause respective lenses to be close to each other or to be far from each other along the optical axis L1 so that the positional relationship of the lenses along the optical axis L1 is adjusted, and thereby the focal length is adjusted. The zoom lens 72 transmits the subject light, which is incident from the incident lens 70, and guides the subject light to the focus lens 74.

The focus lens 74 is a lens movable along the optical axis L1, and is moved along the optical axis L1 to change the focus of a subject image that is formed on the light-receiving surface 22A of the imaging element 22. Hereinafter, in a case of simply describing the position of the focus lens 74, it represents the position of the focus lens 74 along the optical axis L1. The focus lens 74 transmits the subject light, which is incident from the zoom lens 72, and guides the subject light to the stop 19. The stop 19 adjusts the amount of the subject light that is incident from the focus lens 74, transmits the subject light, and guides the subject light to the imaging device body 12.

The control device 20 of the imaging lens 14 includes a lens-side main control unit 76, a focal length sensor 78, a focus lens drive unit 80, a lens position sensor 82, a stop drive unit 84, and an external I/F 86.

The lens-side main control unit 76 comprises a CPU 88, a primary storage unit 90, and a secondary storage unit 92. The CPU 88 controls the entire imaging lens 14. The primary storage unit 90 is a volatile memory that is used as a work area and the like in a case of execution of various programs. Examples of the primary storage unit 90 include a RAM. The secondary storage unit 92 is a non-volatile memory that stores various programs, various parameters, and the like in advance. Examples of the secondary storage unit 92 include a flash memory.

The CPU 88, the primary storage unit 90, and the secondary storage unit 92 are connected to a bus line 94. Further, the focal length sensor 78, the focus lens drive unit 80, the lens position sensor 82, the stop drive unit 84, and the external I/F 86 are also connected to the bus line 94.

The mount 13 is connected to the mount 15 so that the external I/F 86 is connected to the external I/F 52 of the imaging device body 12, and the external I/F 86 takes charge of transmission and reception of various kinds of information between the CPU 88 and the CPU 60 of the imaging device body 12 in cooperation with the external I/F 52.

The focal length sensor 78 detects the state of the zoom lens 72 from the rotation state of the zoom ring, and converts the detected state of the zoom lens 72 into the focal length. Then, the focal length sensor 78 outputs focal length information indicating the focal length obtained by the conversion, to the CPU 88.

The focus lens drive unit 80 includes a focus lens-driving motor (not illustrated). The focus lens drive unit 80 moves the focus lens 74 along the optical axis L1 by operating the focus lens-driving motor under the control of the CPU 88 according to an instruction that is received by the receiving device 46. That is, the focus lens drive unit 80 moves the focus lens 74 along the optical axis L1 by operating the focus lens-driving motor according to an instruction from the CPU 88 and transmitting the power of the focus lens-driving motor to the focus lens 74. The lens position sensor 82 includes, for example, an encoder, and the lens position sensor 82 detects the position of the focus lens 74, and outputs lens position information indicating the detected position, to the CPU 88.

The stop drive unit 84 includes a stop-driving motor (not illustrated). The stop drive unit 84 adjusts the size of the aperture of the stop 19 by operating the stop-driving motor under the control of the CPU 88 according to an instruction that is received by the receiving device 46.

The imaging device 10 according to the embodiment performs autofocus using a so-called contrast AF method.

Figure 3:
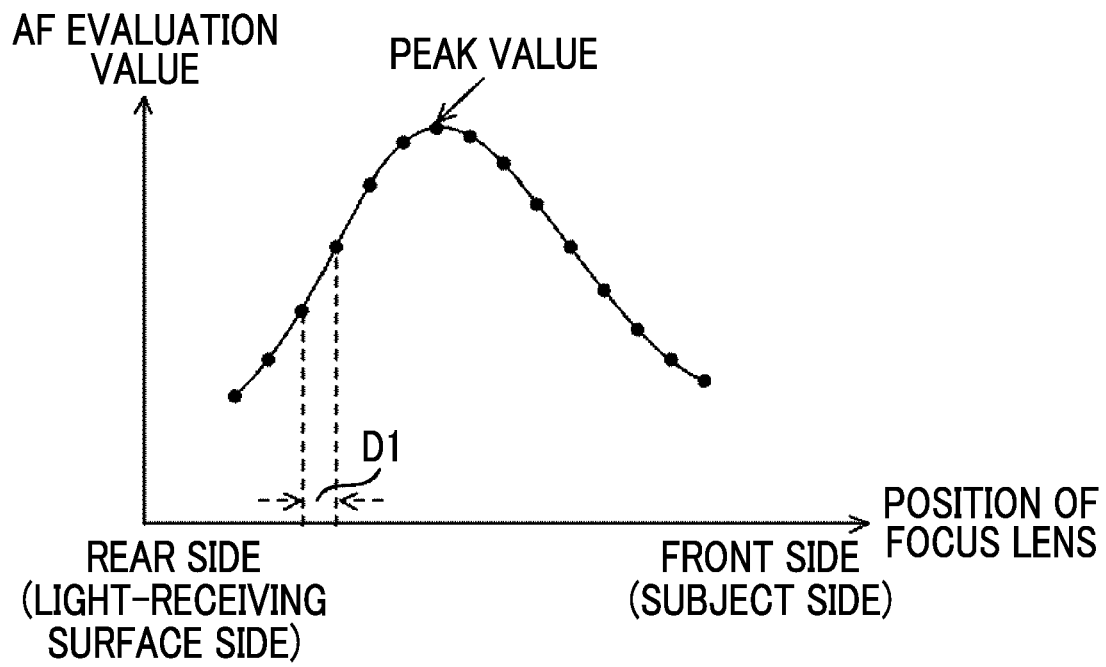
FIG. 3 is a graph for describing autofocus according to each embodiment.
Figure 4:
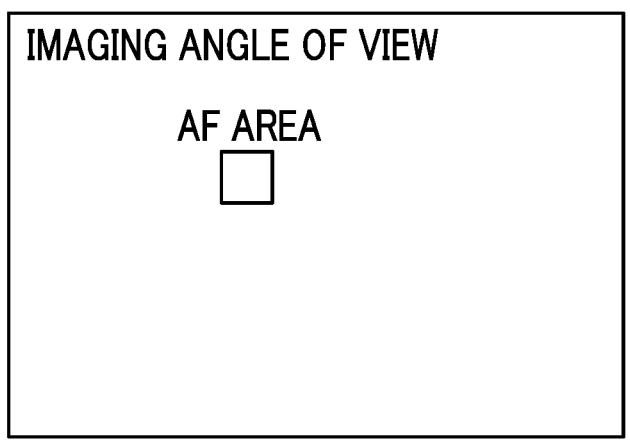
FIG. 4 is a diagram for describing an autofocus area according to each embodiment.

Specifically, the imaging device 10 according to the embodiment derives an evaluation value for autofocus (hereinafter, referred to as "AF evaluation value") in an area within an imaging angle of view while moving the focus lens 74 from the rear side (light-receiving surface side) to the front side (subject side) along the optical axis L1 as illustrated in FIG. 3, for example. Hereinafter, for example, as illustrated in FIG. 4, an area within an imaging angle of view used for deriving the AF evaluation value is referred to as an "autofocus area (AF area)". For example, the position of the AF area within the imaging angle of view is determined by being designated with respect to the live view image (so-called through image) displayed on the display 42 by a user or by tracking the subject within the imaging angle of view. In the embodiment, for the size (length and width) of the AF area, a default value is set.

Then, the imaging device 10 performs focusing control by moving the focus lens 74 to a position where the derived AF evaluation value is the peak value. In the embodiment, as the AF evaluation value, a contrast value of an AF area is applied. Hereinafter, a distance (D1 illustrated in FIG. 3) between consecutive positions in a case of deriving the AF evaluation value while changing the position of the focus lens 74 is referred to as a "distance D1". The distance D1 may be the same or different between consecutive positions.

Figure 5:
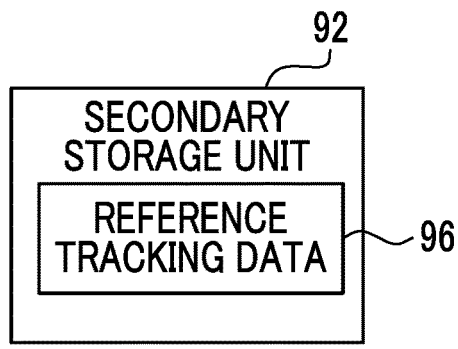
FIG. 5 is a conceptual diagram illustrating an example of contents stored in a secondary storage unit of a lens-side main control unit included in the imaging lens according to each embodiment.

As illustrated in FIG. 5, for example, the secondary storage unit 92 of the lens-side main control unit 76 stores reference tracking data 96. The reference tracking data 96 is reference tracking data corresponding to the imaging lens 14.

Figure 6:
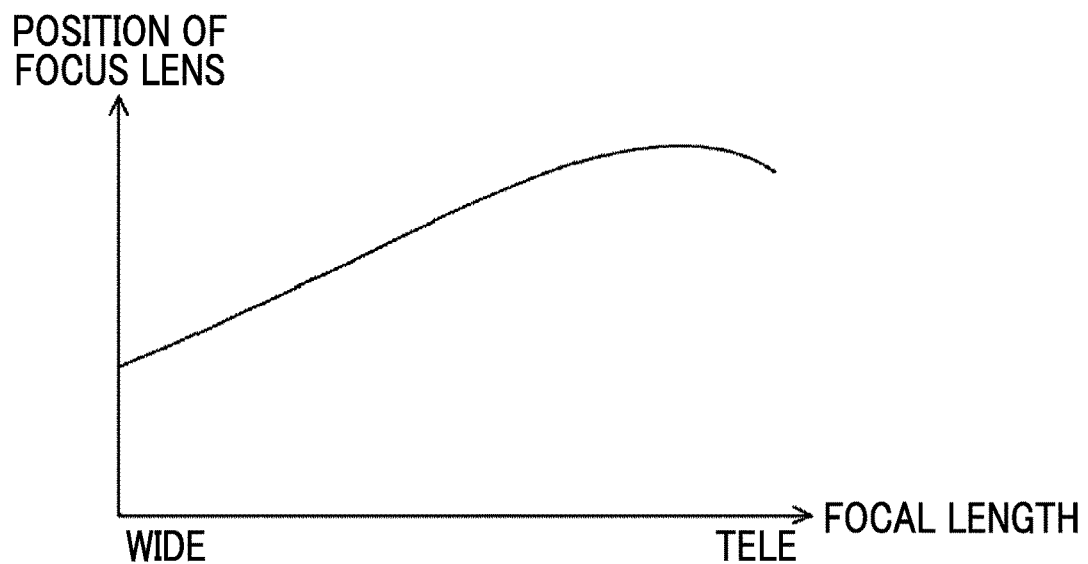
FIG. 6 is a graph for describing reference tracking data according to each embodiment.

As illustrated in FIG. 6, for example, the reference tracking data 96 includes data indicating a correspondence relationship between a focal length at a predetermined imaging distance and a position of the focus lens 74. Here, the imaging distance represents a distance from the light-receiving surface 22A to the subject.

Figure 7:
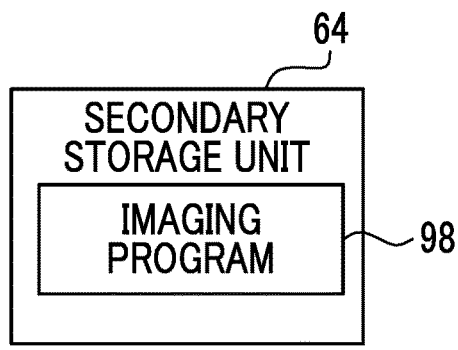
FIG. 7 is a conceptual diagram illustrating an example of contents stored in a secondary storage unit of a body-side main control unit included in an imaging device body according to each embodiment.

On the other hand, as illustrated in FIG. 7, for example, the secondary storage unit 64 of the body-side main control unit 28 stores an imaging program 98. The CPU 60 reads the imaging program 98 from the secondary storage unit 64, develops the imaging program 98 in the primary storage unit 62, and executes tracking data generation processing (refer to FIG. 8) and zoom tracking control processing (refer to FIG. 15), which will be described below in detail, according to the developed imaging program 98. In other words, the CPU 60 operates as a stationariness determination unit, a focus determination unit, a storage control unit, a generation unit, and a zoom tracking control unit by executing the imaging program 98.

Figure 8:
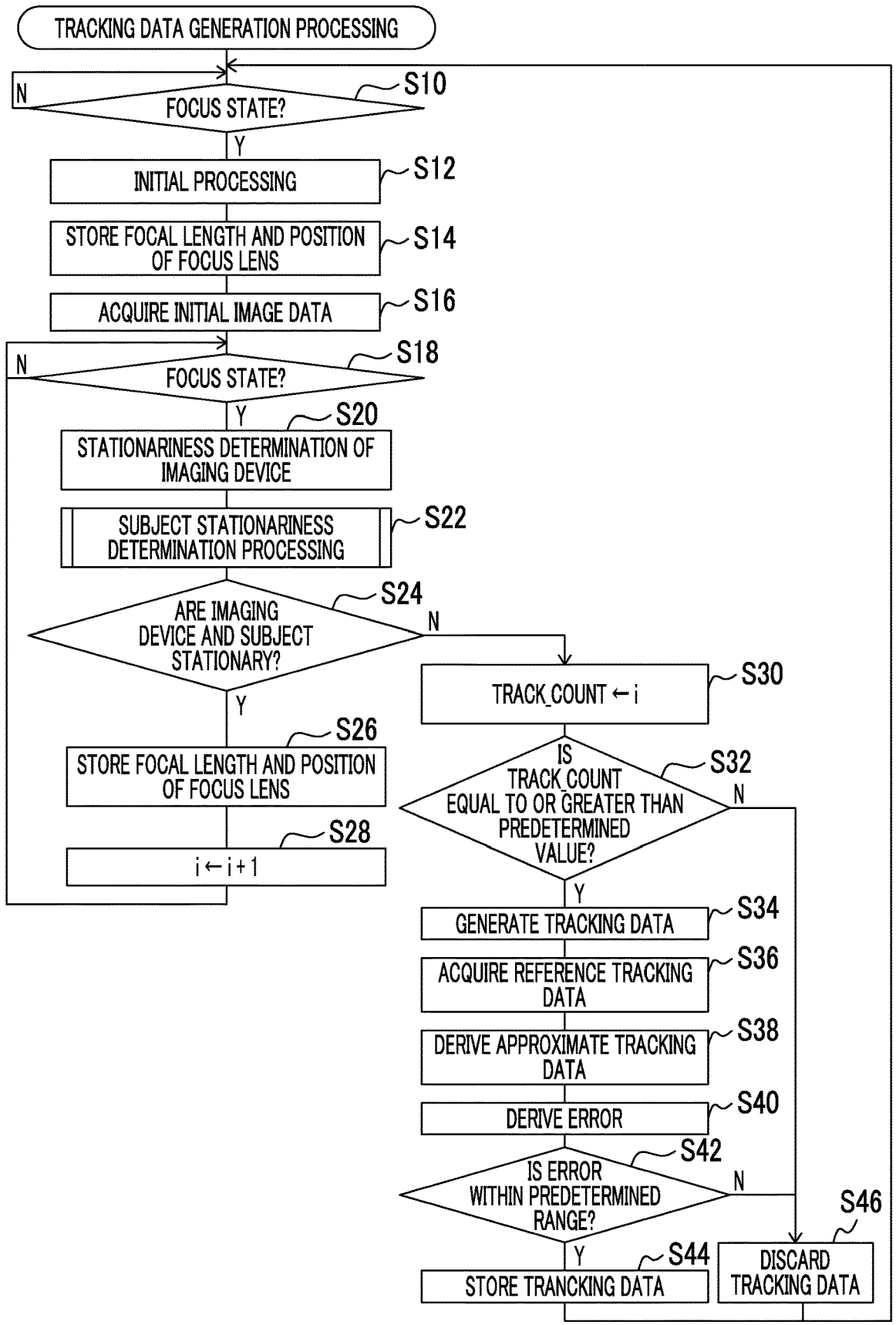
FIG. 8 is a flowchart illustrating an example of tracking data generation processing according to each embodiment.

Next, the operation of the imaging device 10 according to the embodiment will be described with reference to FIGS. 8 to 15. The tracking data generation processing illustrated in FIG. 8 is executed in a case where the power switch of the imaging device 10 is turned on, for example.

In step S10 of FIG. 8, the CPU 60 determines whether a focal state is a focus state in which the subject is in focus (hereinafter, simply referred to as a "focus state"). For example, in the imaging using the imaging device 10, in a case where the user causes the release button provided on the imaging device body 12 to be in the half-pressed state, the AF function works to cause the focus state. In the focus state, the determination of step S10 is affirmative, the processing proceeds to step S12. In a case where the determination of step S10 is negative, step S10 is executed again.

In step S12, as initial processing, the CPU 60 stores 0 in a variable i used as a subscript of a track. As the initial processing, the CPU 60 secures a storage area of a track TRACK_F[ ] for storing the position of the focus lens 74, in the primary storage unit 62. Further, as the initial processing, the CPU 60 secures a storage area of a track TRACK_Z[ ] for storing a focal length, in the primary storage unit 62. The storage areas of the track are examples of a storage unit that stores the focal length and the position of the focus lens 74. The CPU 60 may secure at least one storage area of the track TRACK_F[ ] or the track TRACK_Z[ ], in the secondary storage unit 64. In this specification, the track TRACK_F[ ] (TRACK_Z[ ]) is used to represent the entire track, and the track TRACK_F[i] (TRACK_Z[i]) is used to represent individual elements of the track.

In step S14, the CPU 60 acquires a focal length via the external I/F 52. Specifically, the CPU 60 outputs an instruction for acquiring a focal length to the CPU 88. In a case where the instruction for acquiring the focal length is input from the CPU 60, the CPU 88 acquires the focal length detected by the focal length sensor 78. The CPU 88 outputs the acquired focal length to the CPU 60. Then, the CPU 60 acquires the focal length input from the CPU 88, and performs storage control by storing the acquired focal length in TRACK_Z[i].

Further, the CPU 60 acquires the position of the focus lens 74 via the external I/F 52. Specifically, the CPU 60 outputs an instruction for acquiring the position of the focus lens 74 to the CPU 88. In a case where the instruction for acquiring the position of the focus lens 74 is input from the CPU 60, the CPU 88 acquires the position of the focus lens 74 detected by the lens position sensor 82. The CPU 88 outputs the acquired position of the focus lens 74 to the CPU 60. Then, the CPU 60 acquires the position of the focus lens 74 input from the CPU 88, and performs storage control by storing the acquired position of the focus lens 74 in TRACK_F[i].

After the CPU 60 stores the focal length in TRACK_Z[i] and stores the position of the focus lens 74 in TRACK_F[i], the CPU 60 adds 1 to the variable i.

In step S16, the CPU 60 acquires image data indicating an image which is captured by the imaging element 22 and is subjected to various kinds of processing by the image signal processing circuit 34. Hereinafter, the image data acquired in step S16 is referred to as "initial image data", and an image indicated by the initial image data is referred to as an "initial image". That is, the focal length acquired by the processing of step S14 is an example of a focal length in a case of capturing the initial image. Hereinafter, the focal length acquired by the processing of step S14 is referred to as an "initial focal length".

In step S18, as with step S10, the CPU 60 determines whether the focal state is the focus state in which the subject is in focus. In a case where the determination is negative, step S18 is executed again, and in a case where the determination is affirmative, the processing proceeds to step S20. By the processing of step S10 and step S18, the CPU 60 operates as the focus determination unit.

In step S20, the CPU 60 performs stationariness determination of the imaging device 10 by determining whether the imaging device 10 is stationary. Specifically, the CPU 60 derives the shake angle of the imaging device 10 by integrating the output signal from the gyro sensor 58. Then, the CPU 60 determines whether the imaging device 10 is stationary by determining whether the derived shake angle is within a predetermined range for a predetermined period.

Figure 9:
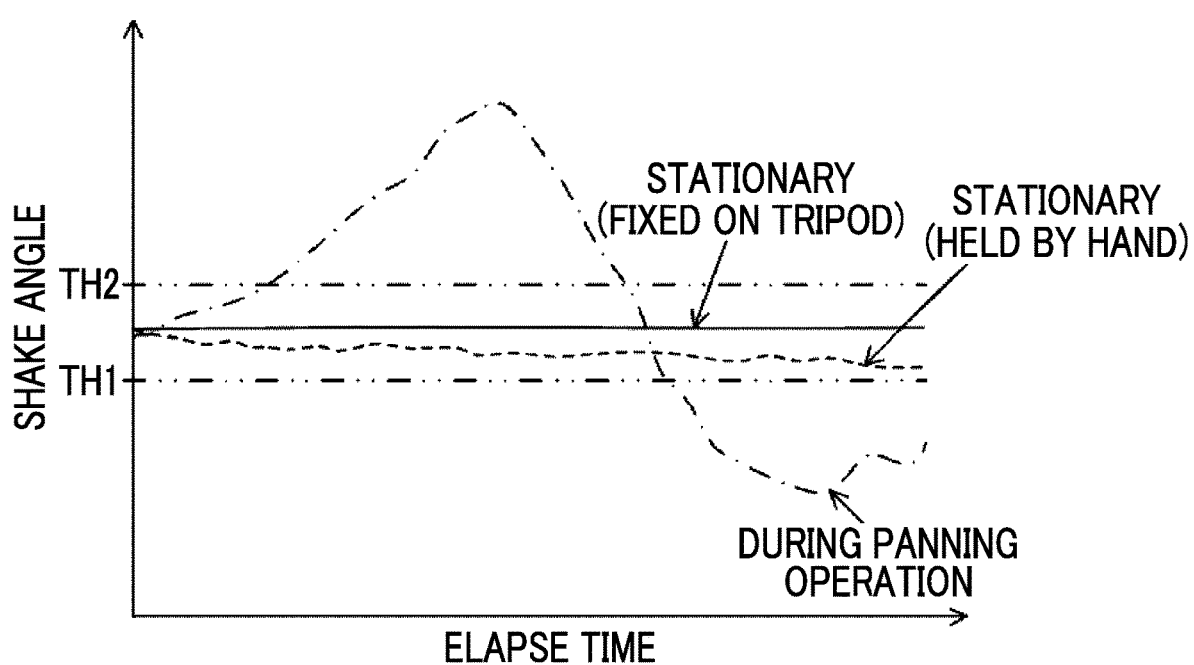
FIG. 9 is a graph for describing stationariness determination processing of the imaging device according to each embodiment.

As illustrated in FIG. 9, for example, the fluctuation amount of the shake angle becomes larger in a case where a user who holds the imaging device 10 in his/her hand performs a panning operation than in a case where the imaging device 10 is stationary by being fixed on a tripod and in a case where the imaging device 10 is stationary by being held by a user in his/her hand. Thus, in the embodiment, two threshold values TH1 and TH2 (TH1<TH2) obtained by adding a predetermined margin to the shake angles in a case where the imaging device 10 is stationary by being fixed on the tripod and in a case where the imaging device 10 is stationary by being held by a user in his/her hand are determined in advance. Then, the CPU 60 determines whether the imaging device 10 is stationary by determining whether the derived shake angle is equal to or greater than the threshold value TH1 and equal to or lower than the threshold value TH2 for a predetermined period.

Figure 10:
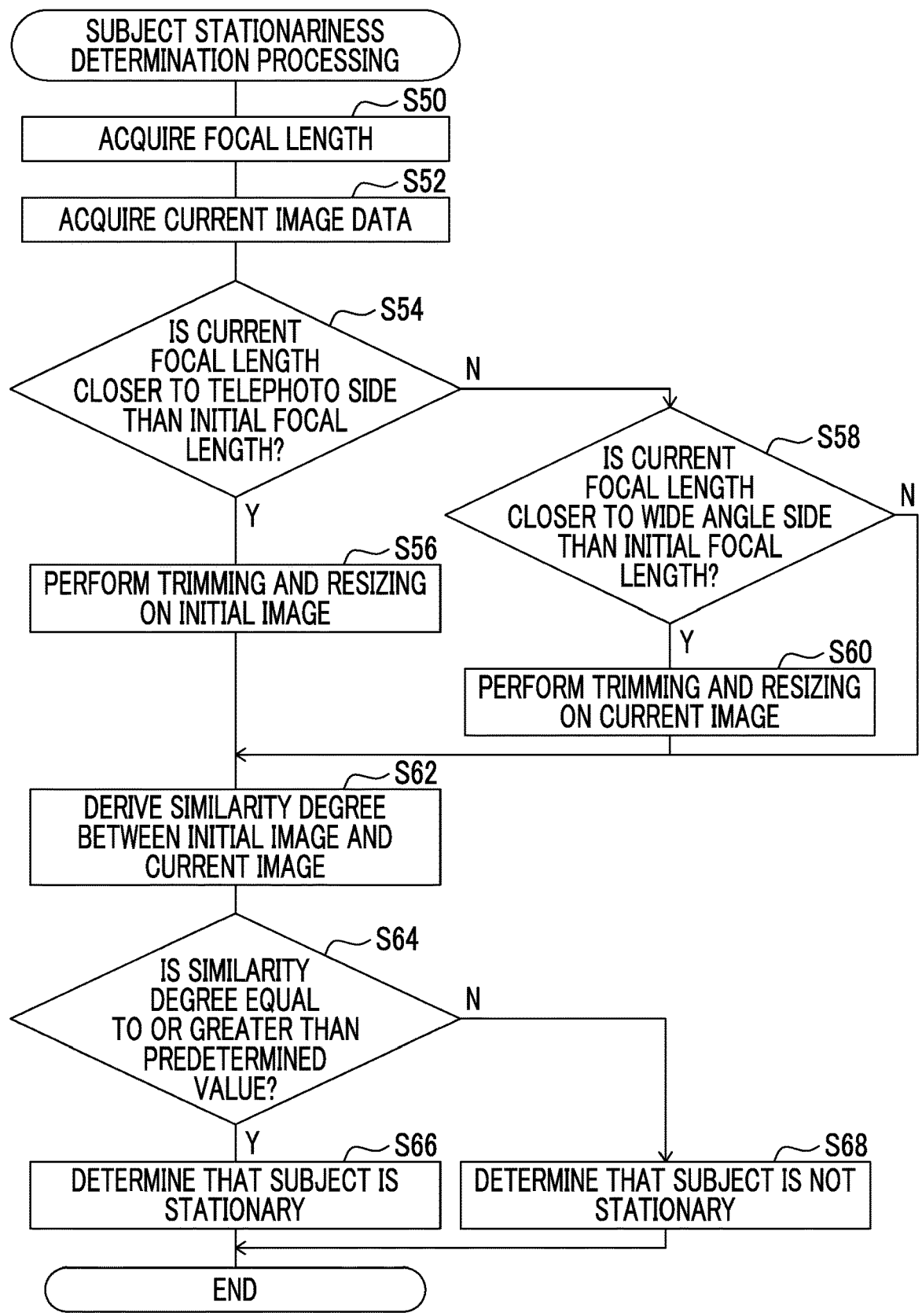
FIG. 10 is a flowchart illustrating an example of subject stationariness determination processing according to each embodiment.

In a case where the processing of step S20 is ended, the subject stationariness determination processing illustrated in FIG. 10 is executed in step S22. By the processing of step S20 and step S22, the CPU 60 operates as the stationariness determination unit.

In step S50 of FIG. 10, as with step S14, the CPU 60 acquires a focal length via the external I/F 52. In step S52, the CPU 60 acquires image data indicating an image which is captured by the imaging element 22 and is subjected to various kinds of processing by the image signal processing circuit 34. Hereinafter, the image data acquired in step S52 is referred to as "current image data", and an image indicated by the current image data is referred to as a "current image". That is, the focal length acquired by the processing of step S50 is an example of a focal length in a case of capturing the current image. Hereinafter, the focal length acquired by the processing of step S50 is referred to as a "current focal length".

In step S54, the CPU 60 determines whether the current focal length acquired by the processing of step S50 is closer to the telephoto side than the initial focal length acquired by the processing of step S14. In a case where the determination is negative, the processing proceeds to step S58, and in a case where the determination is affirmative, the processing proceeds to step S56.

Figure 11:
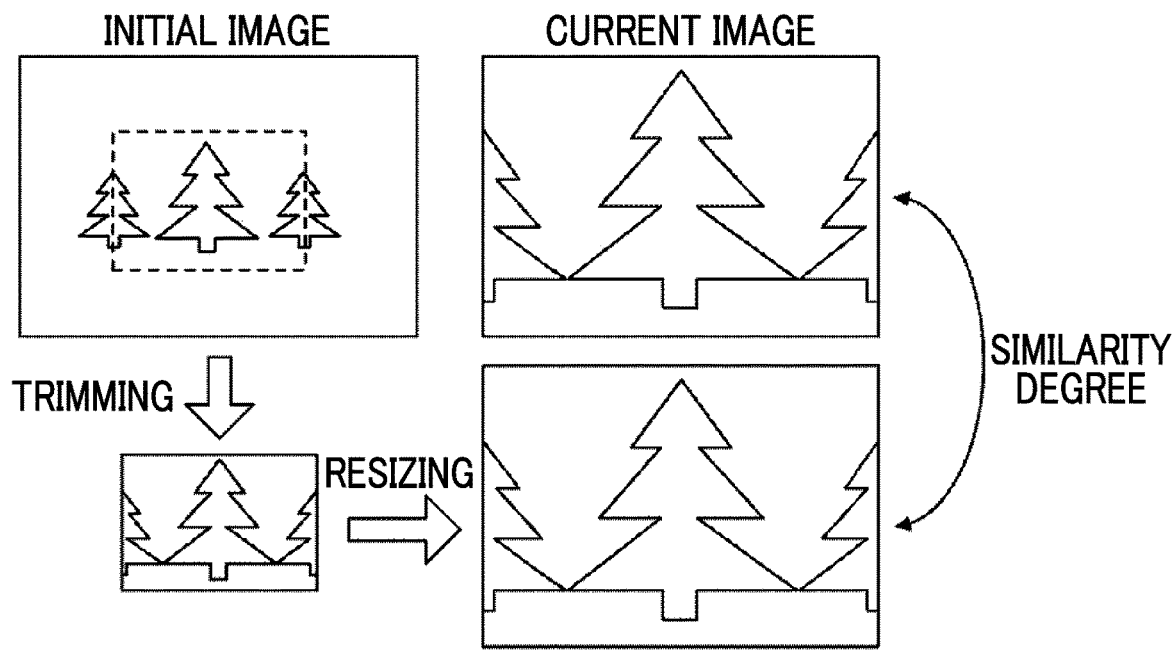
FIG. 11 is a diagram for describing the subject stationariness determination processing according to each embodiment.

In step S56, the CPU 60 performs image processing of trimming a region corresponding to the current image on the initial image as illustrated in FIG. 11, for example. Further, the CPU 60 performs image processing of resizing (enlarging) the image obtained by the trimming on the initial image such that the number of pixels of the image obtained by the trimming on the initial image matches the number of pixels of the current image. The CPU 60 may perform image processing of resizing (reducing) the current image such that the number of pixels of the current image matches the number of pixels of the image obtained by the trimming on the initial image.

On the other hand, in step S58, the CPU 60 determines whether the current focal length acquired by the processing of step S50 is closer to the wide angle side than the initial focal length acquired by the processing of step S14. In a case where the determination is negative, the processing proceeds to step S62, and in a case where the determination is affirmative, the processing proceeds to step S60.

Figure 12:
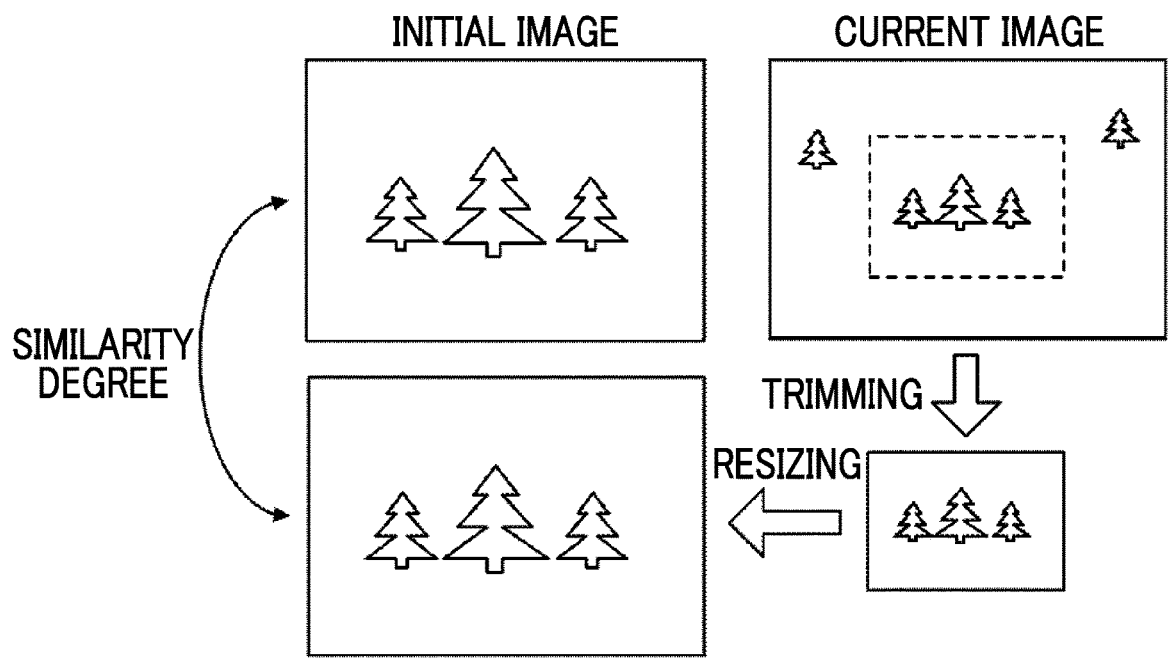
FIG. 12 is a diagram for describing the subject stationariness determination processing according to each embodiment.

In step S60, the CPU 60 performs image processing of trimming a region corresponding to the initial image on the current image as illustrated in FIG. 12, for example. Further, the CPU 60 performs image processing of resizing (enlarging) the image obtained by the trimming on the current image such that the number of pixels of the image obtained by the trimming on the current image matches the number of pixels of the initial image. The CPU 60 may perform image processing of resizing (reducing) the initial image such that the number of pixels of the initial image matches the number of pixels of the image obtained by the trimming on the current image.

In step S62, the CPU 60 derives a similarity degree between the initial image and the current image which are subjected to the above-described processing. As a method of deriving the similarity degree, for example, a method of using an average value of pixel values, a method of using histograms of pixel values, and a method of using a deep learning technique are exemplified.

In a case where the determination of step S54 is affirmative, the initial image in step S62 is the image obtained by performing the trimming and resizing on the initial image by the processing of step S56. Further, in this case, the current image in step S62 is the current image indicated by the current image data acquired by the processing of step S52.

On the other hand, in a case where the determination of step S54 is negative and the determination of step S58 is affirmative, the initial image in step S62 is the initial image indicated by the initial image data acquired by the processing of step S16. Further, in this case, the current image in step S62 is the image obtained by performing the trimming and resizing on the current image by the processing of step S60.

Further, in a case where both the determination of step S54 and the determination of step S58 are negative, the initial image in step S62 is the initial image indicated by the initial image data acquired by the processing of step S16. Further, in this case, the current image in step S62 is the current image indicated by the current image data acquired by the processing of step S52.

In step S64, the CPU 60 determines whether the similarity degree derived by the processing of step S62 is equal to or greater than a predetermined value. In a case where the determination is negative, the processing proceeds to step S68, and in a case where the determination is affirmative, the processing proceeds to step S66.

In step S66, the CPU 60 determines that the subject is stationary. On the other hand, in step S68, the CPU 60 determines that the subject is not stationary, that is, the subject is moving. In a case where the processing of step S66 or step S68 is ended, the subject stationariness determination processing is ended. In a case where the subject stationariness determination processing is ended, the processing proceeds to step S24 of the tracking data generation processing. In the embodiment, since whether the subject is stationary is determined using the image obtained by performing the trimming and resizing on the initial image or current image according to the focal length, it is possible to accurately determine whether the subject is stationary.

In step S24, the CPU 60 determines whether the imaging device 10 is determined to be stationary by the processing of step S20 and the subject is determined to be stationary by the processing of step S22. In a case where the determination is negative, that is, in a case where at least one of the imaging device 10 or the subject is determined to be moving, the processing proceeds to step S30, and in a case where the determination is affirmative, the processing proceeds to step S26.

In step S26, as with step S14, the CPU 60 acquires a focal length via the external I/F 52. Then, the CPU 60 performs storage control by storing the acquired focal length in TRACK_Z[i]. Further, as with step S14, the CPU 60 acquires the position of the focus lens 74 via the external I/F 52. Then, the CPU 60 performs storage control by storing the acquired position of the focus lens 74 in TRACK_F[i]. By the processing of step S26, the CPU 60 operates as the storage control unit. In step S28, the CPU 60 adds 1 to the variable i. In a case where the processing of step S28 is ended, the processing returns to step S18.

That is, each time the user causes the release button provided on the imaging device body 12 to be in a half-pressed state in a case of imaging the subject using the imaging device 10, the position of the focus lens 74 and the focal length in the focus state by the AF function are acquired. Then, the acquired focal length and the acquired position of the focus lens 74 are stored in TRACK_Z[i] and TRACK_F[i].

On the other hand, in step S30, the CPU 60 stores the value of the variable i in a variable TRACK_COUNT for counting the number of combinations of the stored focal length and the stored position of the focus lens 74. In step S32, the CPU 60 determines whether the value of the variable TRACK_COUNT is equal to or greater than a predetermined value. In a case where the determination is negative, the processing proceeds to step S46, and in a case where the determination is affirmative, the processing proceeds to step S34.

Figure 13:
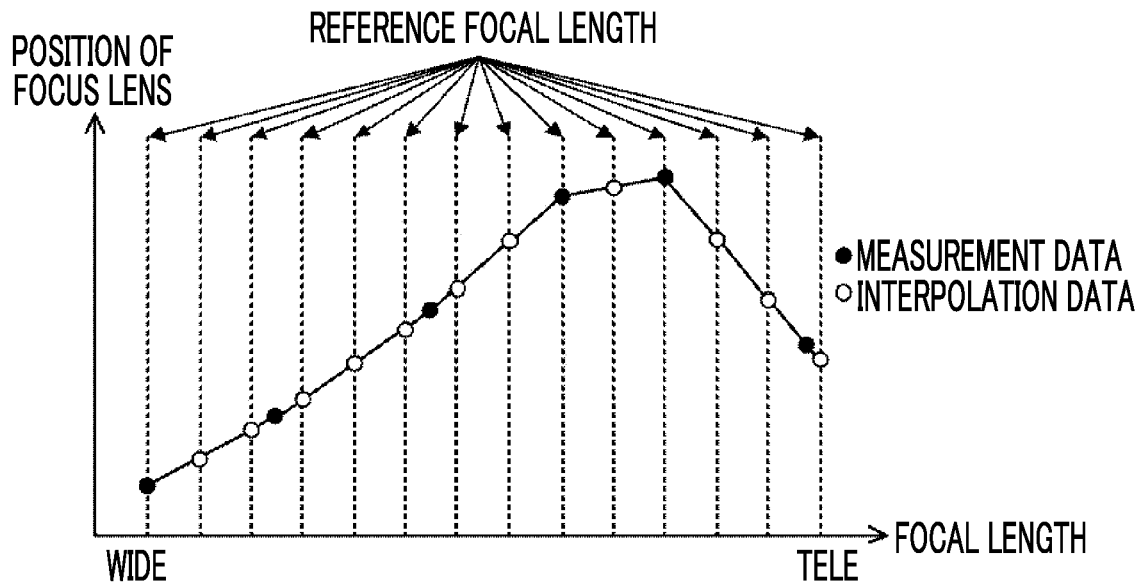
FIG. 13 is a graph for describing interpolation processing according to each embodiment.

In step S34, the CPU 60 generates tracking data for changing the position of the focus lens 74 according to the change in focal length, using a plurality of focal lengths and a plurality of positions of the focus lens 74 stored in the track TRACK_Z[ ] and the track TRACK_F[ ]. Specifically, for example, as illustrated in FIG. 13, in a case where the same focal length as the reference focal length is stored in the track TRACK_ZH, the CPU 60 causes the corresponding focal length and the position of the focus lens 74 corresponding to the focal length to be included in the tracking data. In the example of FIG. 13, the focal length and the position of the focus lens 74 are indicated by black circles located on the broken line.

On the other hand, for the reference focal length which is not stored in the track TRACK_Z[ ], the CPU 60 performs interpolation using a plurality of focal lengths within a predetermined range of the corresponding focal length and a plurality of positions of the focus lens 74 corresponding to the focal lengths. By this interpolation, the CPU 60 derives the position of the focus lens 74 corresponding to the reference focal length, and causes the reference focal length and the derived position of the focus lens 74 to be included in the tracking data. In the example of FIG. 13, the focal length and the position of the focus lens 74 are indicated by white circles located on the broken line. In a case where a plurality of same focal lengths are stored in the track TRACK_Z[ ], an average value of the positions of the focus lens 74 corresponding to the focal lengths may be set as the position of the focus lens 74 corresponding to the focal length. By the processing of step S34, the CPU 60 operates as the generation unit.

In step S36, the CPU 60 acquires the reference tracking data 96 from the secondary storage unit 92. Specifically, the CPU 60 outputs an instruction for acquiring the reference tracking data 96 to the CPU 88. In a case where the instruction for acquiring the reference tracking data 96 is input from the CPU 60, the CPU 88 reads the reference tracking data 96 from the secondary storage unit 92. Then, the CPU 88 outputs the read reference tracking data 96 to the CPU 60. Then, the CPU 60 acquires the reference tracking data 96 input from the CPU 88.

Figure 14:
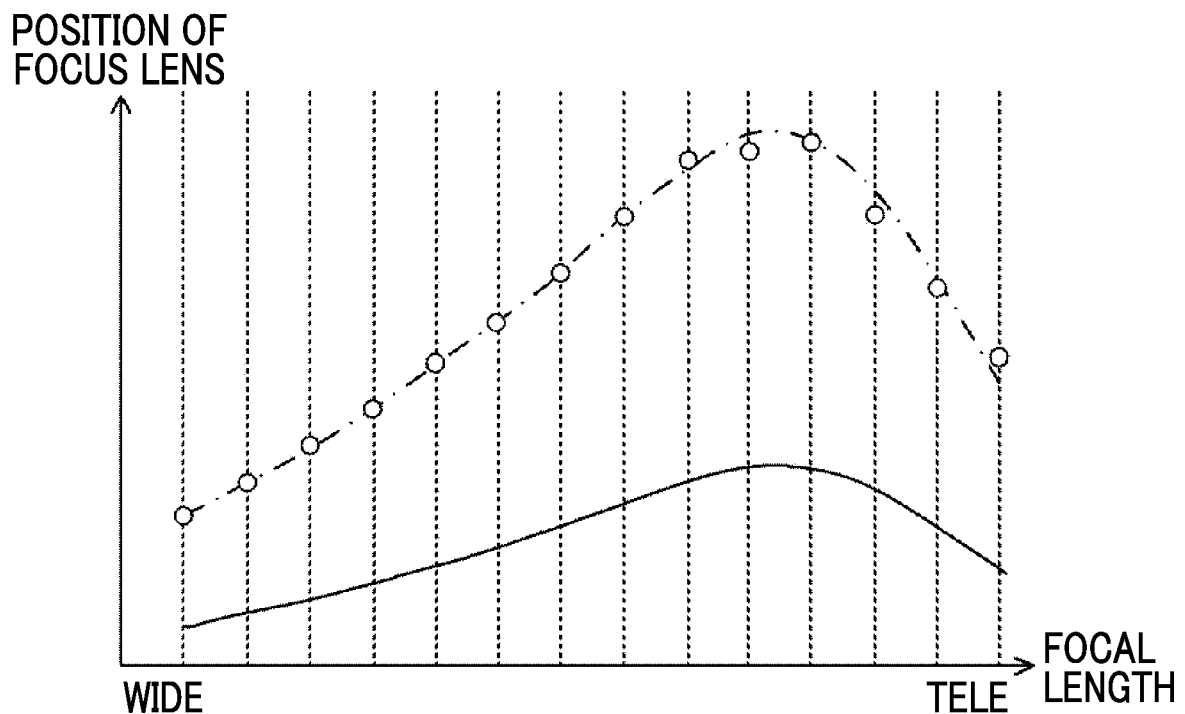
FIG. 14 is a graph for describing error derivation processing according to each embodiment.

In step S38, for example, as illustrated in FIG. 14, the CPU 60 derives data obtained by approximating the reference tracking data 96 acquired by the processing of step S36 to the tracking data generated by the processing of step S34 (hereinafter, referred to as "approximate tracking data"). In the example of FIG. 14, the approximate tracking data is indicated by a dashed line, and the tracking data generated by the processing of step S34 is indicated by white circles. In the example of FIG. 14, the reference tracking data 96 is indicated by a solid line. Here, a specific example of the processing of deriving the approximate tracking data is described.

Here, the reference tracking data 96 is represented as $F_{org}(z)$, the tracking data generated by the processing of step S34 is represented by $F_{act}(z)$, and the approximate tracking data is represented as $F_{cor}(z)$. Incidentally, z is an integer equal to or greater than 0 and equal to or lower than $zp_{max}$ corresponding to each reference focal length. Further, z=0 represents the WIDE end, and $zp_{max}$ represents the TELE end. In the embodiment, the CPU 60 generate the approximate tracking data by transforming $F_{org}(z)$ into the vicinity of $F_{act}(z)$ by a linear function (for example, affine transformation). That is, the approximate tracking data can be represented by the following Expression (1).

$$F_{cor}(z) = A \times F_{org}(z) + B \text{ (A and B are real numbers)} \quad (1)$$

More specifically, the CPU 60 derives A and B in Expression (1) such that the sum of squares of the difference between $F_{act}(z)$ and $F_{org}(z)$ for each z from 0 to $zp_{max}$ expressed in Expression (2) is minimized. Then, the CPU 60 derives the approximate tracking data according to Expression (1) using the derived A and B.

$$\sum_{z=0}^{zp_{max}} (F_{act}(z) - F_{org}(z))^2 \quad (2)$$

In step S40, the CPU 60 derives an error between the tracking data generated by the processing of step S34 and the approximate tracking data derived by the processing of step S38. In the embodiment, the CPU 60 derives a determination coefficient R2 according to Expression (3) as an example of the error. The determination coefficient R2 is a value that approaches 1 as the error becomes smaller. $Fact_{AVG}$ in Expression (3) is an average value of the positions of the focus lens 74 included in the tracking data generated by the processing of step S34.

$$R2 = 1 - \frac{\sum_{z=0}^{zp_{max}} (F_{act}(z) - F_{cor}(z))^2}{\sum_{z=0}^{zp_{max}} (F_{act}(z) - Fact_{AVG})^2} \quad (3)$$

In step S42, the CPU 60 determines whether the error derived by the processing of step S40 is within a predetermined range (for example, in a range of 0.9 to 1.0). In a case where the determination is negative, the processing proceeds to step S46, and in a case where the determination is affirmative, the processing proceeds to step S44.

In step S44, the CPU 60 stores the tracking data generated by the processing of step S34 in the secondary storage unit 64. The CPU 60 may store the tracking data generated by the processing of step S34 in the secondary storage unit 92, or may store the tracking data generated by the processing of step S34 in both the secondary storage unit 64 and the secondary storage unit 92. In a case where the processing of step S44 is ended, the processing returns to step S10. On the other hand, in step S46, the CPU 60 discards the tracking data. For example, the CPU 60 discards the tracking data by releasing the storage area of the track TRACK_F[ ] and the storage area of the track TRACK_Z[ ] secured in the primary storage unit 62. In a case where the processing of step S46 is ended, the processing returns to step S10.

As described with reference to FIG. 8, in the technique of the disclosure, a case where the focal state is first determined to be the focus state means a case where the focal state is determined to be the focus state by the processing of step S10 which is performed first after the power switch of the imaging device 10 is turned on. Furthermore, in the technique of the disclosure, a case where the focal state is first determined to be the focus state also means a case where the focal state is determined to be the focus state by the processing of step S10 which is performed first after the imaging device 10 and the subject are determined not to be stationary by the processing of step S24.

Furthermore, in the technique of the disclosure, a case where the focal state is determined to be the focus state from the next time means a case where the focal state is determined to be the focus state by the processing of step S18 until the imaging device 10 and the subject are determined not to be stationary by the processing of step S24 after the focal state is first determined to be the focus state by the processing of step S10.

Next, the zoom tracking control processing using the tracking data stored in the secondary storage unit 64 by the processing of step S44 of the tracking data generation processing will be described with reference to FIG. 15. The zoom tracking control processing illustrated in FIG. 15 is executed in a case where the power switch of the imaging device 10 is turned on, for example.

Figure 15:
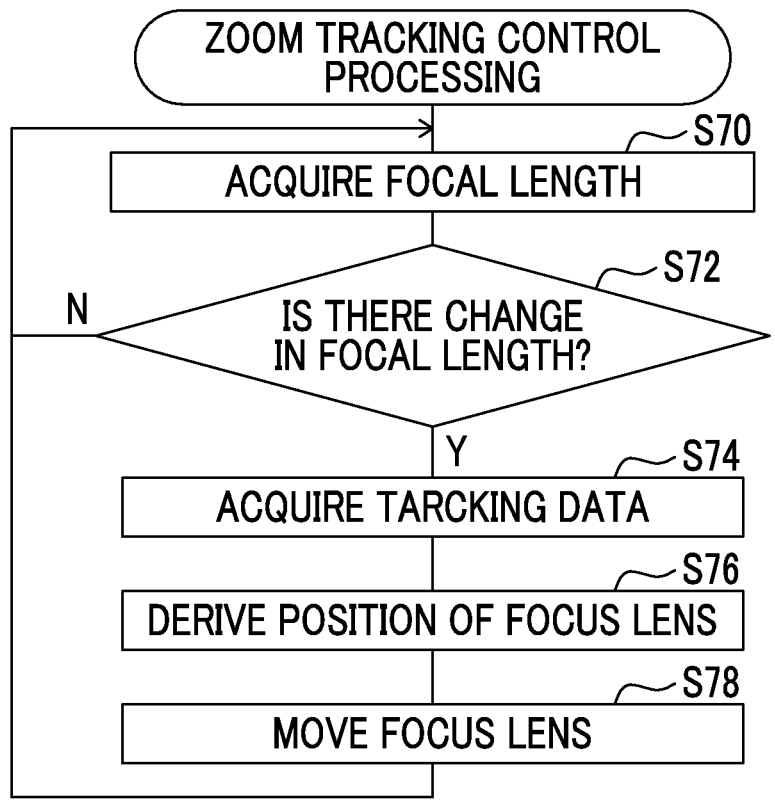
FIG. 15 is a flowchart illustrating an example of zoom tracking control processing according to each embodiment.

In step S70 of FIG. 15, as with step S14 of the tracking data generation processing, the CPU 60 acquires a focal length via the external I/F 52. In step S72, the CPU 60 determines whether the focal length acquired by the processing of step S70 of this time (immediately before) is changed from the focal length acquired by the processing of step S70 of the previous time. In a case where the determination is negative, the processing returns to step S70, and in a case where the determination is affirmative, the processing proceeds to step S74. In step S72, even in a case where the focal length acquired by the processing of step S70 of this time is changed from the focal length acquired by the processing of step S70 of the previous time, in a case where the change amount is within an allowable error range, the CPU 60 may determine that the focal length is not changed.

In step S74, the CPU 60 acquires the tracking data stored in the secondary storage unit 64. In step S76, the CPU 60 derives the position of the focus lens 74 corresponding to the focal length acquired by the processing of step S70 of this time, using the tracking data acquired by the processing of step S74.

In step S78, the CPU 60 outputs an instruction for moving the focus lens 74 to the position derived by the processing of step S76, to the CPU 88. In a case where the instruction for moving the focus lens 74 is input from the CPU 60, the CPU 88 controls the focus lens drive unit 80 to move the focus lens 74 to the position input from the CPU 60. In a case where the processing of step S78 is ended, the processing returns to step S70. By the processing of step S76 and step S78, the CPU 60 operates as the zoom tracking control unit.

As described above, according to the embodiment, tracking data is generated using a plurality of focal lengths and a plurality of positions of the focus lens 74 stored in a case where the imaging device 10 and the subject are determined to be stationary. Accordingly, it is possible to accurately generate the tracking data.

Second Embodiment

A second embodiment of the technique of the present disclosure will be described. The configuration of the imaging device 10 according to the embodiment is the same as that of the first embodiment (refer to FIGS. 1 and 2), and thus the description thereof will be omitted. Since the tracking data generation processing (refer to FIG. 8), the subject stationariness determination processing (refer to FIG. 10), and the zoom tracking control processing (refer to FIG. 15) according to the embodiment are the same as those in the first embodiment, the description thereof will be omitted.

Incidentally, in a case where the focal length is changed, the subject positioned within the AF area may become out of the AF area, and the subject position outside the AF area may become into the AF area. In such a case, by the decrease in focusing accuracy by the AF function, the accuracy of the stationariness determination processing of the subject using the current image and the initial image obtained through imaging in a state where the subject is in focus by the AF function may be decreased. Thus, in the embodiment, the size of the AF area is changed according to the focal length.

The CPU 60 according to the embodiment reads the imaging program 98 from the secondary storage unit 64, develops the imaging program 98 in the primary storage unit 62, and further executes area change processing (refer to FIG. 16) according to the developed imaging program 98. In other words, the CPU 60 further operates as a change unit by executing the imaging program 98.

Next, the operation of the imaging device 10 according to the embodiment will be described with reference to FIG. 16. The area change processing illustrated in FIG. 16 is executed in a case where the power switch of the imaging device 10 is turned on, for example.

Figure 16:
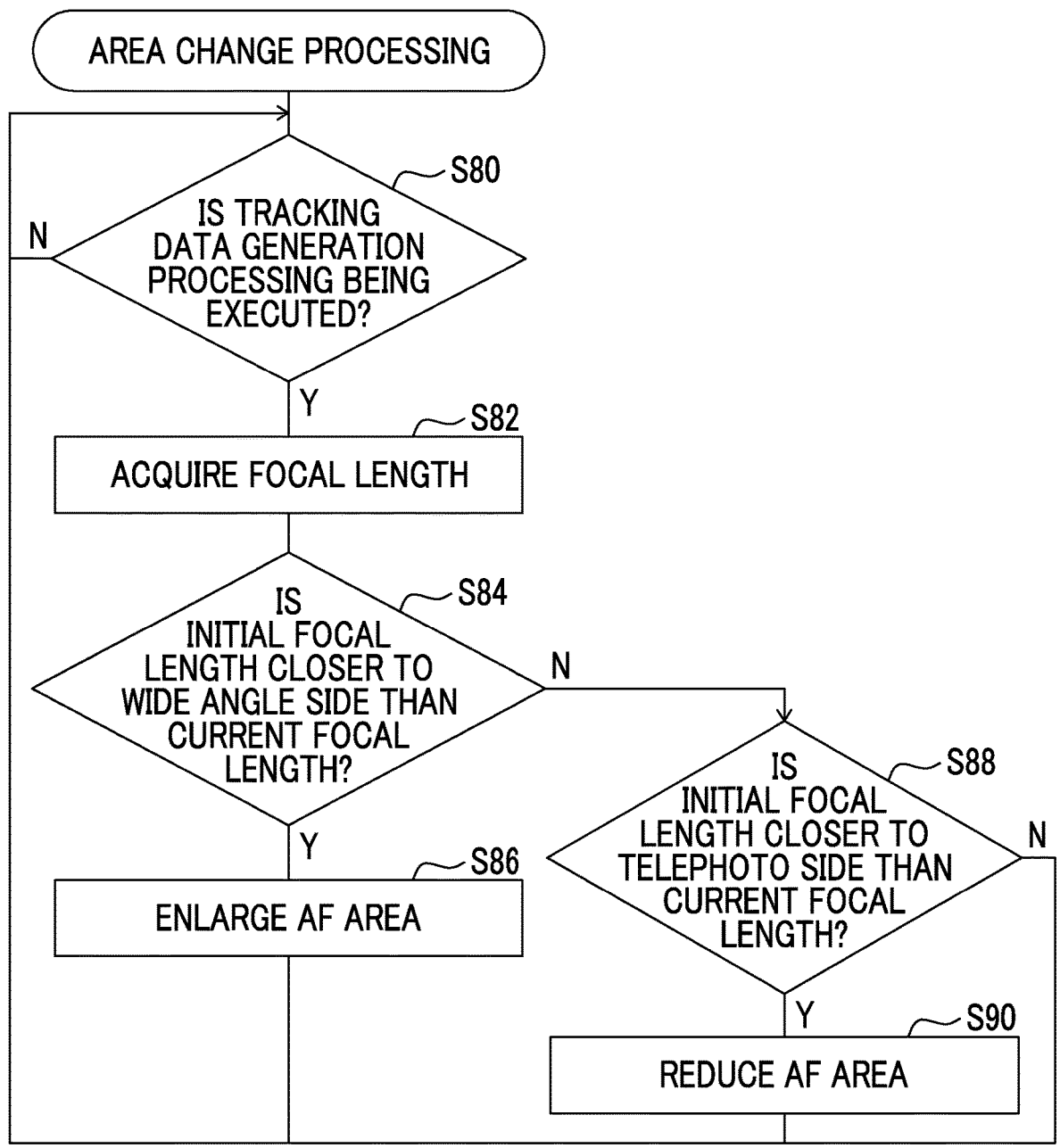
FIG. 16 is a flowchart illustrating an example of area change processing according to a second embodiment.

In step S80 of FIG. 16, the CPU 60 determines whether any processing from step S18 to step S28 of the tracking data generation processing is being executed. In a case where the determination is affirmative, the processing proceeds to step S82, and in a case where the determination is negative, step S80 is executed again. In step S82, as with step S14 of the tracking data generation processing, the CPU 60 acquires a focal length via the external I/F 52. Hereinafter, the focal length acquired by the processing of step S82 is referred to as a "current focal length".

In step S84, the CPU 60 determines whether the initial focal length acquired by the processing of step S14 of the tracking data generation processing closer to the wide angle side than the current focal length acquired by the processing of step S82. In a case where the determination is negative, the processing proceeds to step S88, and in a case where the determination is affirmative, the processing proceeds to step S86.

In step S86, the CPU 60 enlarges the AF area according to the change amount of the current focal length with respect to the initial focal length. In a case where the processing of step S86 is ended, the processing returns to step S80.

On the other hand, in step S88, the CPU 60 determines whether the initial focal length acquired by the processing of step S14 of the tracking data generation processing is closer to the telephoto side than the current focal length acquired by the processing of step S82. In a case where the determination is negative, the processing returns to step S80, and in a case where the determination is affirmative, the processing proceeds to step S90.

In step S90, the CPU 60 reduces the AF area according to the change amount of the current focal length with respect to the initial focal length. In a case where the processing of step S90 is ended, the processing returns to step S80. By the processing of step S86 and step S90, the CPU 60 operates as the change unit.

As described above, according to the embodiment, since the size of the AF area is changed according to the focal length, the possibility that the same subject is positioned within the AF area is increased. As a result, since the decrease in focusing accuracy by the AF function is suppressed, it is possible to suppress the decrease in accuracy of the stationariness determination processing of the subject using the current image and the initial image obtained through imaging in a state where the subject is in focus by the AF function. Furthermore, since the decrease in accuracy of the stationariness determination processing of the subject is suppressed, it is possible to suppress the decrease in accuracy of the tracking data generated using the position of the focus lens 74 and the focal length obtained in a case where the subject is determined to be stationary.

In the above-described embodiments, a case where the focal length and the position of the focus lens 74 are stored in a case where both the imaging device 10 and the subject are determined to be stationary has been described, but the invention is not limited thereto. For example, an aspect in which the focal length and the position of the focus lens 74 are stored in a case where any one of the imaging device 10 and the subject is determined to be stationary may be adopted.

In the above-described embodiments, a case of determining whether the imaging device 10 is stationary by determining whether the shake angle of the imaging device 10 is within a predetermined range for a predetermined period has been described, but the invention is not limited thereto. For example, an aspect in which whether the imaging device 10 is stationary is determined using the output from the gyro sensor 58 in a case where the focal state is first determined to be the focus state and the output from the gyro sensor 58 in a case where the focal state is determined to be the focus state from the next time may be adopted.

In this case, in step S14 or step S16 of the tracking data generation processing, the CPU 60 derives an initial shake angle of the imaging device 10 by integrating output signals from the gyro sensor 58. Further, in step S20 of the tracking data generation processing, the CPU 60 derives a current shake angle of the imaging device 10 by integrating output signals from the gyro sensor 58. Then, an aspect in which the CPU 60 determines whether the imaging device 10 is stationary by determining whether the difference between the derived initial shake angle and the derived current shake angle is within a predetermined range is exemplified.

In the above-described embodiments, a case in which the gyro sensor is applied as the sensor for detecting the vibration of the imaging device 10 has been described, but the invention is not limited thereto. For example, an aspect an acceleration sensor is applied as the sensor for detecting the vibration of the imaging device 10 may be adopted.

Further, in the above-described embodiments, an aspect in which in a state where the imaging device 10 is stationary, information indicating output signals of the gyro sensor 58 is stored in the secondary storage unit 64 in advance may be adopted. In this case, in step S20 of the tracking data generation processing, the CPU 60 subtracts the output signals of the gyro sensor 58 indicated by the information stored in the secondary storage unit 64, from the output signals from the gyro sensor 58. Then, an aspect in which the CPU 60 derives a shake angle of the imaging device 10 by integrating the signals obtained through the subtraction is exemplified. In such an aspect, an aspect in which in a state where the imaging device 10 is stationary and the state of the zoom lens 72 is changed (that is, the focal length is changed), information indicating the output signals of the gyro sensor 58 is stored in the secondary storage unit 64 in advance may be adopted.

In addition, various kinds of processing executed by the CPU executing software (program) in each embodiment described above may be executed by various processors other than the CPU. As the processors in this case, a programmable logic device (PLD) of which the circuit configuration can be changed after manufacture, such as a field-programmable gate array (FPGA), and a dedicated electrical circuitry, which is a processor having a circuit configuration designed exclusively to execute specific processing, such as an application specific integrated circuit (ASIC) are exemplified. Further, the various kinds of processing may be executed by one of the various processors, or executed by the combination of the same or different kinds of two or more processors (for example, combination of a plurality of FPGAs, combination of the CPU and the FPGA, or the like). Furthermore, the hardware structures of the various processors are more specifically electrical circuitry where circuit elements, such as semiconductor elements, are combined.

In the embodiments described above, an aspect in which the imaging program 98 is stored (installed) in the secondary storage unit 64 in advance is described, but the invention is not limited thereto. The imaging program 98 may be provided by being recorded in a recording medium such as a compact disk read only memory (CD-ROM), a digital versatile disk read only memory (DVD-ROM), and a Universal Serial Bus (USB) memory. In addition, the imaging program 98 may be downloaded from external devices via a network.

The disclosure of JP2018-057221 filed on Mar. 23, 2018 is incorporated herein by reference in its entirety. All documents, patent applications, and technical standards disclosed in this specification are incorporated in this specification by reference to the same extent as if the documents, the patent applications, and the technical standards were specifically and individually stated to be incorporated by reference.

What is claimed is:

1. An imaging device, comprising:
    an imaging lens having an imaging optical system including a zoom lens and a focus lens;
    an imaging sensor that is configured to capture an optical image that has passed through the imaging lens; and
    a processor, the processor being configured to execute a process comprising:
    determining whether at least one of the imaging device or a subject is stationary;
    determining whether a focal state is a focus state in which the subject is in focus;
    storing a focal length and a position of the focus lens in a storage unit in a case in which the focal state is determined to be the focus state and the at least one of the imaging device or the subject is determined to be stationary;
    generating tracking data for changing the position of the focus lens in accordance with a change in focal length, using a plurality of focal lengths and a plurality of positions of the focus lens stored in the storage unit; and performing a zoom tracking control using the tracking data, wherein the processor determines whether the subject is stationary using a plurality of images obtained by imaging the subject in a case in which the focal state is determined to be the focus state, wherein the processor is configured not to use the generated tracking data for the zoom tracking control in a case in which an error between data obtained by approximating reference tracking data corresponding to the imaging lens to the generated tracking data, and the generated tracking data, is outside of a predetermined range.

2. The imaging device according to claim 1, wherein the processor generates the tracking data in a case in which at least one of the imaging device or the subject is determined not to be stationary.

3. The imaging device according to claim 1, wherein the process further comprises changing a size of a focus area in accordance with the focal length.

4. The imaging device according to claim 3, wherein the processor is configured to enlarge the focus area in a case in which an initial focal length, in a case in which the focal state is first determined to be the focus state, is closer to a wide angle side than a current focal length in a case in which the focal state is determined to be the focus state a next time or thereafter, and reduces the focus area in a case in which the initial focal length is closer to a telephoto side than the current focal length.

5. The imaging device according to claim 1, wherein the processor is configured to generate the tracking data by deriving the position of the focus lens corresponding to a reference focal length by interpolating the position of the focus lens corresponding to the reference focal length using a plurality of focal lengths within a predetermined range of the reference focal length and a plurality of positions of the focus lens corresponding to the plurality of focal lengths, in a case in which the reference focal length is not stored in the storage unit.

6. The imaging device according to claim 1, wherein the processor is configured to generate the tracking data in a case in which a predetermined number or more of focal lengths and positions of the focus lens are stored in the storage unit.

7. The imaging device according to claim 1, wherein the plurality of images comprises an initial image obtained by imaging the subject in a case in which the focal state is first determined to be the focus state, and a current image obtained by imaging the subject in a case in which the focal state is determined to be the focus state a next time or thereafter.

8. The imaging device according to claim 7, wherein the processor is configured to determine whether the subject is stationary using an image obtained by performing trimming and resizing on the initial image or the current image in accordance with the focal length.

9. The imaging device according to claim 8, wherein the processor is configured to perform trimming and resizing on the initial image in a case in which the focal length in a case of capturing the current image is closer to a telephoto side than the focal length in a case of capturing the initial image, and performs trimming and resizing on the current image in a case in which the focal length in a case of capturing the current image is closer to a wide angle side than the focal length in a case of capturing the initial image.

10. The imaging device according to claim 1, further comprising:

a sensor that detects vibration of the imaging device, wherein the processor is configured to determine whether the imaging device is stationary using an output from the sensor in a case in which the focal state is first determined to be the focus state and an output from the sensor in a case in which the focal state is determined to be the focus state a next time or thereafter.

11. An imaging method executed by an imaging device including an imaging lens having an imaging optical system including a zoom lens and a focus lens, and including an imaging sensor that captures an optical image that has passed through the imaging lens, the imaging method comprising:

determining whether at least one of the imaging device or a subject is stationary;

determining whether a focal state is a focus state in which the subject is in focus;

storing a focal length and a position of the focus lens in a storage unit in a case in which the focal state is determined to be the focus state and the at least one of the imaging device or the subject is determined to be stationary;

generating tracking data for changing the position of the focus lens in accordance with a change in focal length, using a plurality of focal lengths and a plurality of positions of the focus lens stored in the storage unit; and performing a zoom tracking control using the generated tracking data, wherein determining whether the subject is stationary is performed by using a plurality of images obtained by imaging the subject in a case in which the focal state is determined to be the focus stat;

wherein the generated tracking data is not used for the zoom tracking control in a case in which an error between data obtained by approximating reference tracking data corresponding to the imaging lens to the generated tracking data, and the generated tracking data, being outside of a predetermined range.

12. A non-transitory computer-readable storage medium storing a program executable by a computer, which controls an imaging device including an imaging lens having an imaging optical system including a zoom lens and a focus lens, and including an imaging sensor that captures an optical image that has passed through the imaging lens, to perform processing comprising:

determining whether at least one of the imaging device or a subject is stationary;

determining whether a focal state is a focus state in which the subject is in focus;

storing a focal length and a position of the focus lens in a storage unit in a case in which the focal state is determined to be the focus state and the at least one of the imaging device or the subject is determined to be stationary;

generating tracking data for changing the position of the focus lens according to a change in focal length, using a plurality of focal lengths and a plurality of positions of the focus lens stored in the storage unit; and performing a zoom tracking control using the generated tracking data, wherein determining whether the subject is stationary is performed by using a plurality of images obtained by imaging the subject in a case in which the focal state is determined to be the focus state, wherein the generated tracking data is not used for the zoom tracking control in a case in which an error between data obtained by approximating reference tracking data corresponding to the imaging lens to the generated tracking data, and the generated tracking data, being outside of a predetermined range.

\* \* \* \* \*